United States Patent
Peterson

[11] 3,888,512
[45] June 10, 1975

[54] POWER TRANSMISSION WITH ADJUSTABLE FULCRUM

[76] Inventor: Walter O. Peterson, 875 Classic Pl., Eugene, Oreg. 97401

[22] Filed: May 16, 1973

[21] Appl. No.: 360,677

[52] U.S. Cl. .................................. 280/255; 74/522
[51] Int. Cl. ............................................ B62m 1/04
[58] Field of Search ........ 280/255, 246; 74/29, 522

[56] References Cited
UNITED STATES PATENTS

| | | | |
|---|---|---|---|
| 438,935 | 10/1890 | Montgomery | 74/522 |
| 855,626 | 6/1907 | Furru | 74/522 |
| 1,271,568 | 7/1918 | Hall | 74/522 |

Primary Examiner—Robert B. Reeves
Assistant Examiner—Thomas E. Kocovsky
Attorney, Agent, or Firm—James D. Givnan, Jr.

[57] ABSTRACT

A power transmission including multiple levers for operation about positionable fulcrum wheels which permit varying of the levers mechanical advantage. Keepers associated with each lever retain the latter for walking travel about a section of the wheel periphery while additionally permitting positioning of the fulcrum wheel along its lever to alter the mechanical advantage. To position each fulcrum wheel a carrier framework is adjustably mounted on a conveyance frame member. The carrier additionally provides means for retention of each fulcrum wheel against forces applied to the wheel periphery during lever operation. Alternate lever operation drives roller chain segments about sprockets of an axle housing having a uni-directional clutch to drive a wheel of the conveyance.

12 Claims, 9 Drawing Figures

POWER TRANSMISSION WITH ADJUSTABLE FULCRUM

BACKGROUND OF THE INVENTION

The present invention relates generally to power transmission means and more particularly to one having an adjustable fulcrum for optimum leverage for desired force multiplication. The present invention is shown and described with reference to a bicycle, however, such is in no way intended to imply the invention is so restricted.

The known prior art discloses various arm or lever arrangements for translating reciprocal lever motion into rotary motion. Included in such arrangements are levers associated with flexible elements with the latter entrained about and driving a rotary element such as a sprocket which in association with a uni-directional clutch imparts rotary motion to a conveyance wheel. A number of U.S. patents have issued on such various combinations some which are embodied within drives for bicycles, to wit U.S. Pat Nos. 2,391,809; 2,392,904; 2,831,703; 3,132,877; 3,414,293; 3,661,404 to mention a few. The above patent disclosures further render old in the art the provision for varying of the attachment point between a lever and the powered flexible element for leverage purposes and further the variable extension of a pedal arm for the same purpose.

SUMMARY OF THE INVENTION

The present invention is embodied within a lever and fulcrum combination wherein the fulcrum position may be readily shifted along the lever to vary the mechanical advantage. When the force is to be applied in a continuous manner as in the application of torque to a shaft, multiple levers may be utilized to alternately draw flexible elements such as roller chains attached at the lever ends about sprocket means which ultimately power the driving wheel. One embodiment of the present invention is for use within a bicycle wherein the levers are in the form of pedal arms which are associated at their opposite ends beyond their fulcrums with roller chain segments entrained about sprockets. Relocation of the fulcrums along the levers or pedal arms by carrier means varies both the length and travel of the work performing segment of the lever. With the present invention embodied as a bicyle transmission the operator may move said segment in a series of short, high leverage strokes with high force multiplication to the driving wheel or conversely long, low leverage strokes with low force multiplication to best handle the terrain encountered.

An important object of the present invention is to provide means whereby the relationship of a lever and its fulcrum may be readily changed. The lever and fulcrum are retained in adjustable toothed engagement by keeper elements confining the arm for rocking or operative motion about the fulcrum. Each fulcrum is adjustably supported by a single carrier. Accordingly, a new fulcrum location is established, upon such positioning, changing the mechanical advantage. Importantly, an infinite range of fulcrum positions are possible.

A further object is to provide a carrier for said fulcrums which enables simultaneous shifting of multiple fulcrums along their associated levers. Such shifting and resetting of the fulcrums is achieved in a synchronized manner with positive retention of the lever arm on the fulcrum by keeper elements. The fulcrum carrier is in turn positionable along supporting rails of the conveyance.

A still further important object of the invention is the provision of fulcrum assemblies which include multiple keeper elements in the form of rollers permitting constrained rocking motion of the pedal arm or lever about the fulcrum. Fore and aft movement is imparted to the fulcrum assemblies by the fulcrum carrier for varying force multiplication.

A further important object is the provision of a power transmission means for applying torque values to a shaft of powered conveyance without utilization of gear trains, roller chain shifting mechanisms or cooperating multiple sprockets. The latter system as now found in the bicycle art is objectionable from the standpoint of both original cost and maintenance.

A further important object resides in the capability of the present transmission means to permit relocation and locking of the fulcrum wheels by companion pinion gears during continued application of force to the pedal arms.

DETAILED DESCRIPTION OF THE INVENTION

Figure 1:
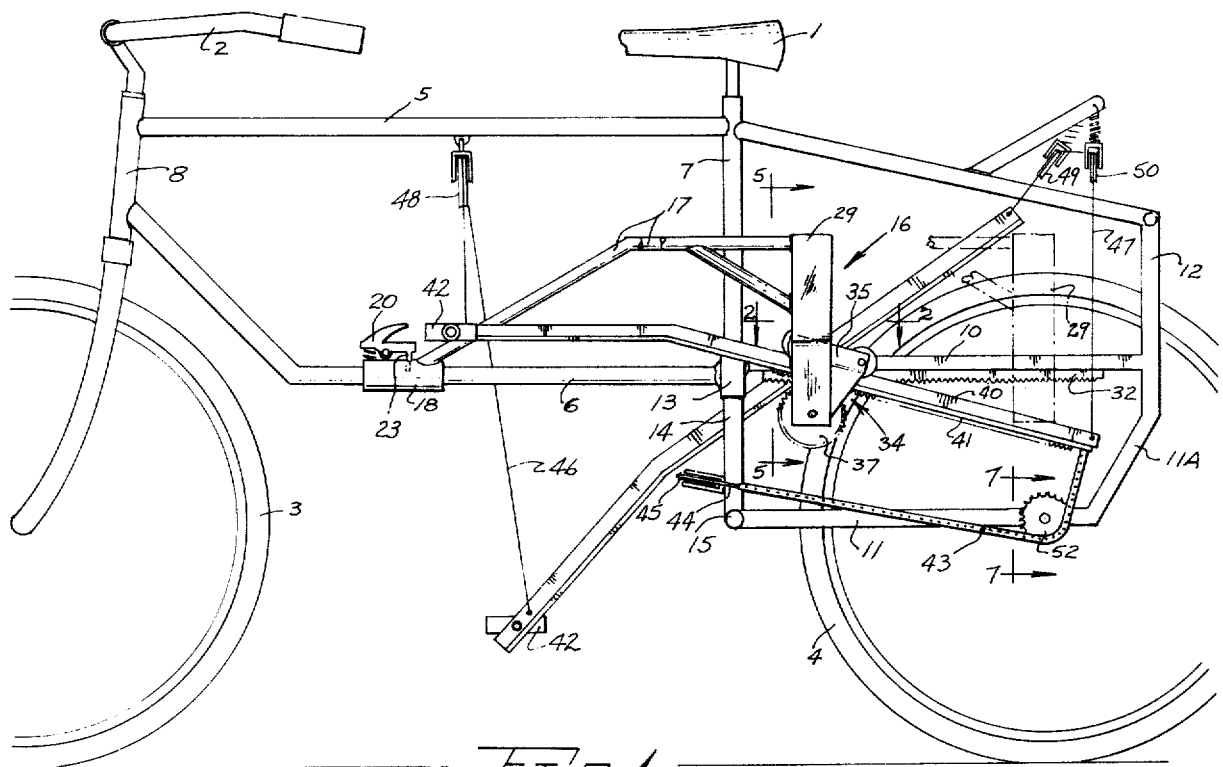
FIG. 1 is a side elevational view of a bicycle equipped with the present invention.

With continuing reference to the accompanying drawings wherein applied reference numerals indicate parts similarly identified in the following specification, a bicycle frame, which may be of welded tubular construction similar to conventional bicycle construction, supports a seat 1, handle bars 2, with front and rear wheels indicated at 3, 4 and upper and lower frame components at 5 and 6 which terminate forwardly in a steering post 8. A seat post at 7 completes the main frame of the bicycle.

Figure 6:
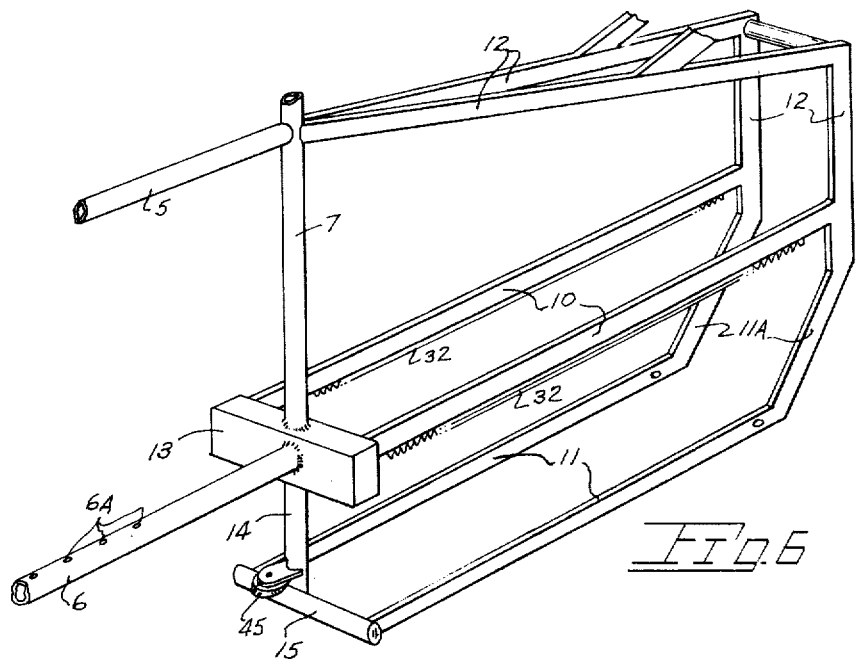
FIG. 6 is a perspective view of the rear portion of the bicycle frame for use with the present invention.

With attention to FIGS. 1 and 6 and integral with the earlier described frame are the following described frame components including a pair of rearwardly and horizontally extending frame rails 10 along which the latter described fulcrum carriers may be positioned. Spaced below said rails are a pair of frame members 11 having upwardly inclined segments at 11A in securement with the rearward end of rails 10. Extending upwardly from rails 10 are frame reinforcing members 12 which members incline forwardly for securement with seat post 7. The bicycle frame includes a box member 13 which receives the forward ends of rails 10 and mounts a depending frame member 14 to the lower end of which is secured a crossmember 15 interconnecting frame members 11. Frame member 6 extends forwardly from box member 13 and is apertured at 6A for later mentioned purposes.

With continuing reference to FIG. 1 and jointly to FIG. 5, a carrier generally at 16 comprises a weldment of plate construction which serves to mount a pair of later described fulcrum assemblies permitting both rocking motion thereof as well as for fore and aft positioning of said assemblies. For positioning of carrier 16 in fore and aft directions, the same is provided with forwardly extending tubular members 17 which terminate in securement with a collar 18 in slidable and lockable engagement with bicycle frame member 6. A latch mechanism 20 on collar 18 is spring biased to a locked position wherein a projection 23 occupies a collar opening and an aligned opening of a series of openings 6A in bicycle frame member 6.

Figure 4:
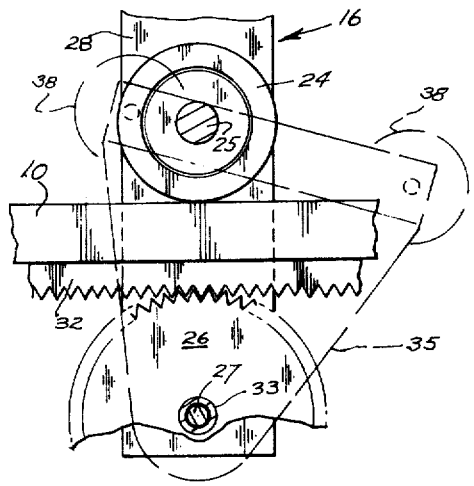
FIG. 4 is a sectional elevational view taken along line 4—4 of FIG. 2 and showing a fragment of the carrier in supported engagement on a frame rail.
Figure 5:
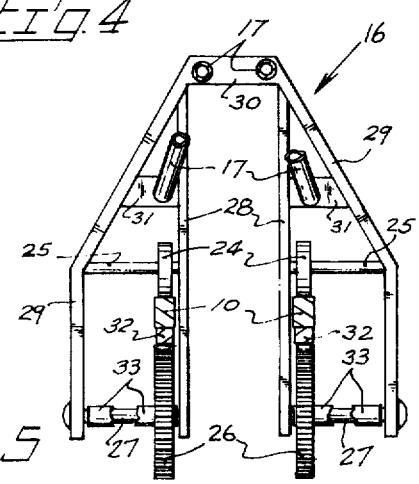
FIG. 5 is a vertical section taken along line 5—5 of FIG. 1 showing the fulcrum carrier with the fulcrum assemblies removed therefrom for illustrative purposes.

With particular attention to FIGS. 4 and 5 it will be seen that carrier 16 is adapted for roller supported movement along frame rails 10 by means of rollers 24 mounted on carrier mounted spindles at 25. The upper surfaces of frame rails 10 provide a pair of supporting surfaces along which rollers 24 travel during fore and aft positioning of the carrier. Additionally, carrier 16 includes a pair of pinions 26 on shafts 27, the latter secured intermediate carrier components 28 and 29 which are in the form of plates merging upwardly and thereat interconnected by a central bridge portion 30. Gussets at 31 and bridge 30 provide rigidity as well as mount members 17. With attention again to pinions 26 the same are intermeshed with racks 32 secured to the underside of rails 10 and in conjunction within rollers 24 facilitate carrier travel along rails 10 for the purpose of relocating the following described fulcrum assemblies. Sleeves at 33 constitute common bearing sleeves for each pinion 26 and its companion fulcrum wheel as later described.

Figure 2:
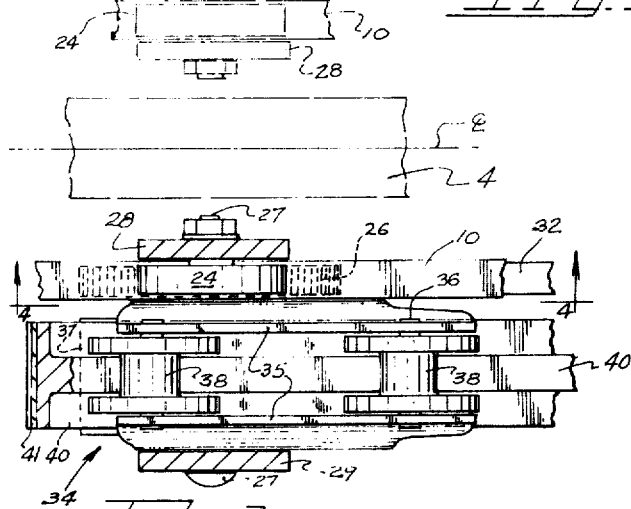
FIG. 2 is a horizontal plan view of a fulcrum assembly taken along line 2—2 of FIG. 1.
Figure 3:
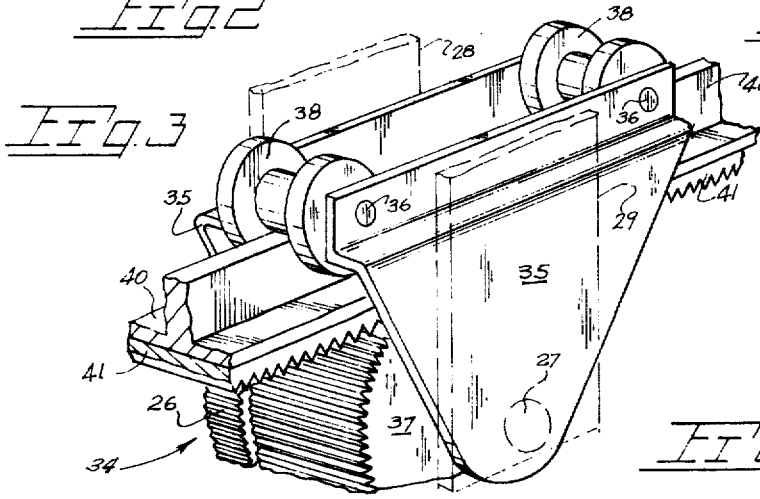
FIG. 3 is a perspective of a fulcrum assembly.

With joint attention to FIGS. 1 through 3, the fulcrum assemblies are indicated generally therein by reference numeral 34 with the assemblies adapted for rocking motion about the aligned axes of shafts 27. Each fulcrum assembly includes a pair of side plates 35, irregular in section and joined adjacent their upper edges in a spaced apart manner by pins 36 while the lowermost ends of a pair of plates are apertured for reception of a shaft 27 of carrier 16 in a manner permitting rocking movement of plates 35 about the shaft. Intermediate each pair of plates 35 is a fulcrum wheel 37 also adapted for movement about the axis of its supporting shaft 27. Each fulcrum wheel and its companion pinion 26 rotate conjointly by reason of being keyed or otherwise fixed to the common bearing sleeve 33 (FIG. 5). From the foregoing it will be seen that each pair of side plates 35 may move arcuately about the axis of a shaft 27 during lever operation while the fulcrum wheel therebetween is held stationary by reason of its companion pinion being stationary with respect to rack 32. In effect, the pinion and the fulcrum wheel are one functionally speaking. Modification of side plates 35 to provide a single plate for later described keepers 38 would permit such a combination. Means are accordingly provided for retention of the fulcrum wheel against movement.

Each fulcrum assembly additionally includes keepers in the form of rollers 38 rotatably carried by pins 36 which keepers function to retain a lever in the form of a pedal arm at 40 and specifically a gear rack 41, integral therewith, in toothed engagement with its subjacent fulcrum wheel 37. Gear rack 41 of each pedal arm extends a substantial length along the underside of the arm.

Forward segments of said arms have angularly directed segments for purposes of convenient travel of foot pedals at 42. Each arm 40 may be of an inverted T-section or other suitable crossection providing adequate strength. At the rearward or work performing end of each arm is secured one end of lengths of roller chain 43 whose forward ends are interconnected by a common segment of cable 44 which is entrained about sheave 45 on the bicycle frame. For purposes of synchronizing arm travel, the arms are interconnected adjacent their corresponding ends by lengths of flexible cable 46-47 entrained respectively through sheaves 48 and 49-50, the latter two sheaves directing cable 47 over the bicycle frame. Desirably each of said pulley wheels are resiliently supported as by helical springs for smooth arm travel.

Figure 7:
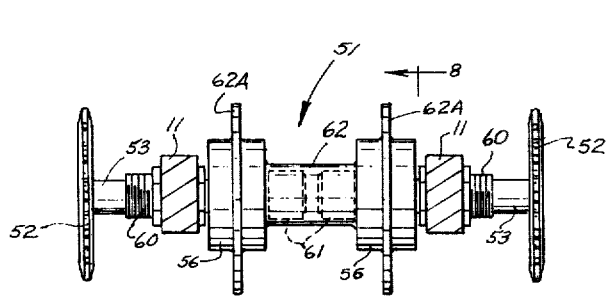
FIG. 7 is an elevational view taken along line 7—7 of FIG. 1 disclosing a rear axle assembly.
Figure 8:
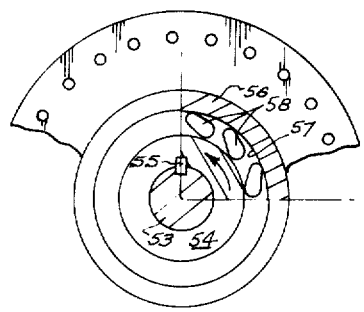
FIG. 8 is a sectional elevation taken along line 8—8 of FIG. 7 with a quadrant broken away to show clutch details.
Figure 9:
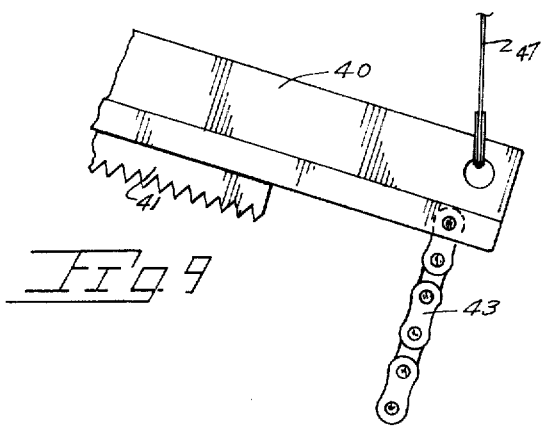
FIG. 9 is an elevational view of an arm end with chain segment attached.

With reference to FIGS. 7 and 8 an axle assembly is indicated generally at 51 which includes uni-directional clutch mechanisms driven by chain driven sprockets 52. Said axle assembly includes input shafts 53 which are provided on their inner ends with a first clutch member 54 keyed at 55 to the shaft. Radially spaced from said first or driving clutch member is a driven clutch member 56 of cup-like configuration having an annular wall 57 against which cam elements 58 may be engaged by rotation of clutch member 54 in the direction indicated by the applied arrow. Overrunning of driven clutch member 56 during opposite rotation of driving clutch member 54 results in inward displacement and disengagement of the cam elements 58 from wall 57 with like clutch structure being well known by those skilled in the art and being referred to generally as cam clutches. One manufacturer of cam clutches having a series of cam elements being the Morse Corporation. The input shafts 53 are suitably journalled within sleeve bearings 60 adjacent there outer ends while there inner ends are journalled within bearings 61. An axle housing at 62 is integral with driven clutch members 56, the housing including spoke receiving flanges 62A extending thereabout.

With reference jointly to FIG. 1 and FIGS. 7 and 8 it will be seen that during upward movement of the work performing end of lever 40 the roller chain segment secured thereto will impart counterclockwise rotation to sprocket 52 and associated driving clutch member 54 while at the same time opposite travel of the corresponding end of the other arm will result in reverse passage of its chain segment driving the sprocket 52 associated therewith in an opposite direction with the cam elements 58 associated therewith permitting overrunning of the common clutch member 56 of axle housing 62.

In operation of the present power transmission means, effort applied to pedal arm or lever 40 results in same walking about fulcrum wheel 37 by reason of toothed engagement of the arm carried rack 41 and the stationary fulcrum wheel. Simultaneously side plates 35, associated with the arm, rock about the axis of the fulcrum wheel with keepers 38 retaining the arm carried rack in engagement with the fulcrum wheel. The work performing or rearwardly projecting portion of the arm powers attached chain segment 43 to drive sprocket 52 and the associated clutch components in a direction imparting forward motion to the bicycle shown. As earlier noted an overrunning clutch mechanism permits the remaining sprocket to rotate in an opposite direction coincident with the opposite downward travel of its associated chain segment and pedal arm end.

To increase the mechanical advantage and force multiplication of each pedal arm the carrier 16 may be shifted rearwardly from its FIG. 1 position by manual repositioning of collar 18 along frame member 6. Such relocation of carrier 16 is facilitated by travel of rollers 24 along supporting surfaces of frame rails 10. Such travel results in the conjoint rotation of pinions 26 and their companion fulcrum wheels by reason of their common bearing sleeves 33 which also serve to hold the fulcrum wheels against lever loads during lever operation. The fulcrum wheels will walk rearwardly along pedal arm rack 41 while pinions 26 move along racks 32. In effect, a rearward position of carrier 16 from its FIG. 1 full line position may be termed a low gear position in that substantial force multiplication is achieved by reason of the ratio of the shortened work segment of the pedal arm to the lengthened effort segment of arm 40. Return of carrier 16 to its forward, full line position of FIG. 1 the ratio will be altered to approach a one to one ratio. Obviously, modifications could be made in the arm and rack configuration to permit still further forward positioning of carrier 16 and the fulcrum wheels 37 carried thereby past a one to one ratio into a position wherein the fulcrum position would result in lever 40 being in a speed multiplying relationship with the fulcrum wheel.

While the present embodiment of the invention is disclosed in association with a pedal operated conveyance, it is to be understood that the source of effort applied to the levers may be of mechanical origin and further, the present transmission means may be otherwise embodied, as for example, within a stationary structure to achieve desired ends.

While I have shown but one embodiment of the invention it will be apparent to those skilled in the art that the invention may be embodied still otherwise without departing from the spirit and scope of the invention.

Having thus described the invention what is desired to be secured under a letters Patent is:

1. In combination with a first-class lever having means associated with the work performing end of the lever for imparting rotary motion to a driven member of a supporting structure, the improvement comprising,
a fulcrum assembly including a fulcrum wheel in toothed engagement with said lever and about which said lever is powered in a rocking manner, keeper means retaining said lever in engagement with the fulcrum wheel during rocking lever motion, said keeper means rockably mounted for movement about the axis of said wheel during lever operation,
a carrier for said fulcrum assembly positionable and lockable fore and aft along a fixed member of the supporting structure to position the fulcrum wheel and said keeper means along said lever to vary the mechanical advantage of the lever, and means for retention of the fulcrum wheel against rotational forces applied to the wheel periphery during lever operation, said retention means comprising a pinion on said carrier in coaxial alignment with said fulcrum wheel and in toothed engagement with the fixed member, sleeve means interconnecting said pinion and the fulcrum wheel to lock the latter against rotation other than during fore and aft movement of the carrier.

2. The invention as claimed in claim 1 wherein said keeper means comprises multiple rollers, side plates adjacent the fulcrum wheel supporting said rollers, said side plates being rockably mounted for movement about the axis of the fulcrum wheel during lever operation.

3. The invention as claimed in claim 1 wherein said carrier additionally includes rollers in rolling supported engagement with the fixed member of the supporting structure to facilitate positioning of the carrier therealong.

4. Power transmission means translating reciprocal lever motion into rotary motion for powering of a conveyance, said power transmission means comprising,
multiple levers each receiving alternately applied force adjacent a lever end, said levers coupled adjacent their work performing ends to driven members imparting rotational force to the latter,
a fulcrum assembly associated with each of said levers, each of said fulcrum assemblies including a fulcrum wheel, multiple keeper means retaining each lever at spaced apart points therealong in rockable engagement with its fulcrum wheel, said multiple keeper means rockable about the axis of said wheel during lever operation, and
a carrier for said fulcrum assemblies supported for positioning along carrier supporting surfaces of the conveyance to vary the location of the fulcrum wheels and hence the mechanical advantage of the levers, means operable intermediate the carrier and the fulcrum wheel comprising a pinion in engagement with the carrier supporting surface, said pinion and a companion fulcrum wheel interconnected preventing fulcrum wheel rotation while said pinion is held stationary by the carrier.

5. The invention as claimed in claim 4 wherein said carrier is adapted for adjusted locked engagement with the conveyance for locating the fulcrum wheels of each fulcrum assembly at a desired position along said levers for the mechanical advantage desired.

6. The invention as claimed in claim 4 wherein said pinion and companion fulcrum wheel are interconnected by a carrier mounted sleeve.

7. The invention as claimed in claim 6 wherein the conveyance includes an axle housing, said driven members are embodied within a clutch of the overrunning type within the axle housing permitting alternating rotational forces to be imparted to the housing in an unidirectional manner.

8. Power transmission means for a pedal operated wheel supported conveyance, said transmission means comprising,
multiple levers having pedals affixed adjacent one of their ends, means connecting the opposite work performing end of each lever with a driven rotatable element,
a fulcrum carrier positionable and lockable along a supporting member of the conveyance, fulcrum assemblies mounted on said carrier each having a fulcrum wheel engaged in a walking manner by one of said levers, said wheels positioned along the levers during carrier movement, said fulcrum assemblies further including keepers each acting on said levers retaining same in wheel engagement during lever operation, said keepers also positioned along said levers during carrier movement, and said carrier additionally including means for immobilizing the fulcrum wheel against forces applied to the wheel periphery during lever operation, said carrier upon repositioning along the supporting surfaces of the conveyance jointly repositions each fulcrum wheel along its lever to alter the mechanical advantage with subsequent locking of the carrier in place immobilizing the fulcrum wheel.

9. The invention as claimed in claim 8 wherein said carrier is adapted for positioning along rail members of the conveyance, said rail members oppositely disposed from a conveyance wheel.

10. The invention as claimed in claim 9 wherein said carrier includes manually slidable and lockable means permitting the operator to readily vary the mechanical advantage of the levers.

11. The invention as claimed in claim 10 wherein each of said rail members is integral with a gear rack, said means for immobilizing the fulcrum wheel including pinions on said carrier in mesh with said gear rack, means interconnecting said pinions with a companion fulcrum wheel to restrict fulcrum wheel at all times other than during carrier positioning.

12. The invention as claimed in claim 11 wherein said levers and said fulcrum wheels are in toothed engagement.

* * * * *